United States Patent [19]

Khoe et al.

[11] 4,327,963
[45] May 4, 1982

[54] COUPLING ELEMENT WITH A LENS FOR AN OPTICAL TRANSMISSION SYSTEM

[75] Inventors: Giok D. Khoe; Joannes P. M. Gieles; Gerard Kuyt, all of Eindhoven, Netherlands

[73] Assignee: U.S. Philips Corporation, New York, N.Y.

[21] Appl. No.: 95,913

[22] Filed: Nov. 19, 1979

Related U.S. Application Data

[63] Continuation of Ser. No. 945,725, Sep. 25, 1978, abandoned, which is a continuation of Ser. No. 795,728, May 11, 1977, abandoned.

[30] Foreign Application Priority Data

May 31, 1976 [NL] Netherlands .................. 7605819

[51] Int. Cl.$^3$ .............................................. G02B 7/26
[52] U.S. Cl. ............................. 350/96.18; 350/96.20; 350/413
[58] Field of Search ............... 331/94.5 H; 350/96.15, 350/96.17, 96.18, 96.31, 413, 416, 96.20, 96.21, 96.22

[56] References Cited

U.S. PATENT DOCUMENTS

| 3,666,347 | 5/1972 | Kitano et al. .................. 350/413 X |
| 3,950,075 | 4/1976 | Cook et al. .................... 350/96.22 |
| 4,025,157 | 5/1977 | Martin ........................... 350/96.18 |
| 4,030,811 | 6/1977 | Khoe et al. ..................... 350/96.17 |

FOREIGN PATENT DOCUMENTS

| 1257359 | 12/1971 | United Kingdom ............... 350/416 |
| 1467796 | 3/1977 | United Kingdom . |

OTHER PUBLICATIONS

Cohen et al., "Microlenses for Coupling Junction Lasers to Optical Fibers", *Applied Optics*, vol. 13, No. 1, Jan. 1974, pp. 89–94.

Zemon et al., "Eccentric Coupler for Optical Fibers . . . ", *Applied Optics*, vol. 14, No. 4, Apr. 1975, pp. 815–816.

Dakss, "Coupling Light Sources to Fibers", *Laser Focus*, vol. 11, No. 12, Dec. 1975, pp. 31–34.

Suzuki et al., "Concentrated-Type Directional Coupler for Optical Fibers", *Applied Optics*, vol. 15, No. 9, Sep. 1976, pp. 2032–2033.

*Primary Examiner*—John D. Lee
*Attorney, Agent, or Firm*—Marc D. Schechter

[57] ABSTRACT

A coupling element for an optical transmission system, in which the coupling element comprises a convex lens having a refractive index which is dependent on the radius r of a shell in the lens, and a holder. Use is preferably made of lenses having a refractive index $N_{(r)} = N_1 \cdot (2 - (R/R_o)^2)^{\frac{1}{2}}$, where $N_1$ is the refractive index of the core of an optical fiber (approximately 1.55) and Ro is the radius of the lens.

The coupling of monomode fibers via lenses of this kind can be effected wth large dimensional tolerances.

3 Claims, 10 Drawing Figures

COUPLING ELEMENT WITH A LENS FOR AN OPTICAL TRANSMISSION SYSTEM

This is a continuation of application Ser. No. 945,725, filed Sept. 25, 1978, now abandoned; which in turn is a continuation of Ser. No. 795,728, filed May 11, 1977, now abandoned.

BACKGROUND OF THE INVENTION

The invention relates to an optical transmission system, comprising an optical wave guide fiber and a coupling element for coupling the optical waveguide fiber to a light source or to a light detector or to a further fiber. The coupling element includes a lens which is arranged in front of one end of the fiber, and fiber and the lens have optical axes substantially in common. The invention also relates to a coupling element for the optical transmission system and to a lens for the coupling element.

An optical transmission system is described on pages 341 to 359 of "Phatonics", published by Balkanski and Lallemand, 1973. In this publication light is radiated into the core of a fiber via a system of lenses arranged in front of an end face of the fiber. The lenses of the system of lenses must be accurately positioned and oriented relative to the core of the fiber, relative to the semiconductor layer junction shown, and relative to each other.

Notably the axes of the optically cylindrical lenses must intersect the center of the fiber core and should be situated in the plane of the laser junction. The mounting of the lenses in the correct position in front of the end face of the fiber is difficult.

SUMMARY OF THE INVENTION

An object of the invention is to provide an optical transmission system in which the above difficulties are substantially mitigated.

To this end, the system according to the invention comprises a lens which is substantially convex, and which has a refractive index which decreases from the center outwards as a function of the radius. Because the convex lens is rotationally-symmetrical about any axis through its center, the orienting of the lens in front of the end of the fiber will be simpler in comparison with, for example, the optically cylindrical lens. The orientation of such a lens is even more simplified if the lens and the fiber have substantially the same diameter. It has been found that the use of such a convex lens offers, in addition to an improvement of the coupling efficiency, a reduction of the dispersion occurring in the fiber in the case of a multimode fiber having a transient-like varying refractive index. This can be explained on the basis of the fact that the convex lens has a converging effect, with the result that the light diverging from the light source is converted into a beam of substantially parallel light rays. As a result, a smaller number of modes will occur in the multimode fiber, dispersion thus being counteracted. The described attractive properties of the lens can be further improved if the refractive index of the lens approximates the value $$N_1 \cdot (2-(r/R_o)^2)^{\frac{1}{2}},$$

in which
R$_o$: the radius of the lens
r: the distance from the center of the lens and
N$_1$: approximates the value of the refractive index of the fiber.

The diverging radiation of a point-like light source, for example, as described in "Journal of Applied Physics", Vol. 45, No. 11, November 1974, pages 4899 to 4906, arranged in front of such a lens is completely converted into a beam of parallel light rays. In the case of a multimode fiber, substantially all light emitted by the source will be conducted through the core. If a fiber having a step-wise varying refractive index is irradiated via a lens of this kind, moreover, only a comparatively small number of modes will occur in the fiber.

An optical transmission system comprising a preferred embodiment of the coupling element according to the invention is characterized in that the coupling element comprises a holder, through which a capillary extends, the lens and an end of the fiber being fixed opposite each other in the said capillary.

The invention will be described in detail hereinafter with reference to the accompanying diagrammatic drawings.

DESCRIPTION OF THE PREFERRED EMBODIMENTS

Figure 1:
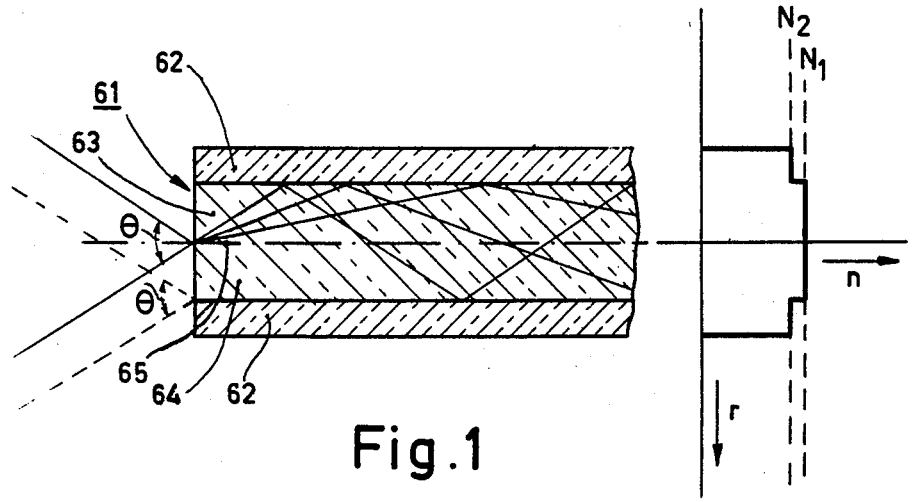
FIG. 1 is a cross-sectional view of an optical waveguide fiber, showing the acceptance angle of an end thereof.

FIG. 1 shows a section of an optical waveguide fiber 61 having a step-wise varying refractive index. This is diagrammatically denoted at the right of the fiber 61. The outer jacket 62 of the fiber 61 has a refractive index N$_2$, and the core 63 has a refractive index N$_1$. The acceptance angle $\theta$, at which the core 63 accepts light which subsequently propagates in the core 63, is determined by the ratio between the refractive indices N$_1$ and N$_2$. The acceptance angle $\theta$ at the edge 64 of the core 63 equals that in the center 65 of the core 63. When the acceptance angle $\theta$ is fully utilized when the core 63 is irradiated, the quantity of light energy to be transported will be maximum. However, all sorts of propagation modes will occur, as diagrammatically denoted by arrows, which will result in a comparatively high dispersion. This is considered undesirable, notably in the telecommunication field.

Figure 2:
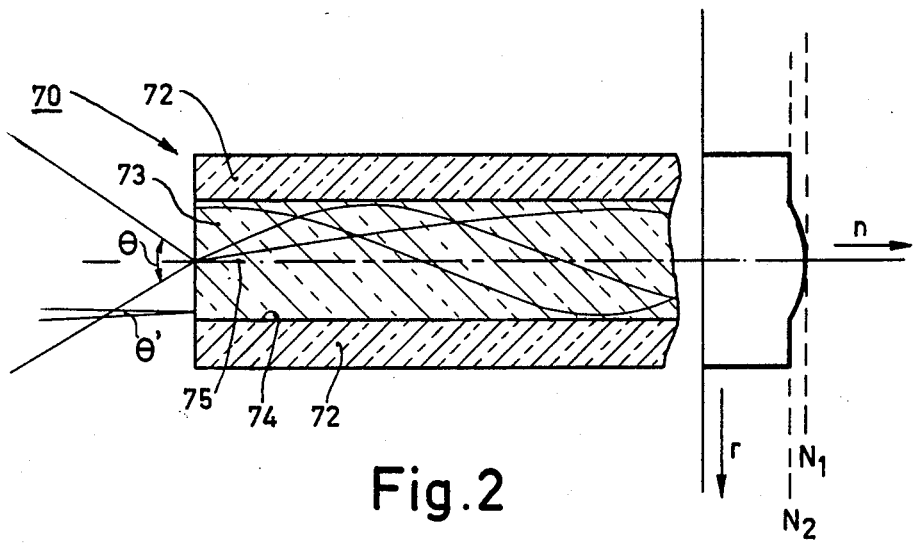
FIG. 2 is a cross-sectional view of a fiber having a continuously varying refractive index, showing the acceptance angle thereof.

FIG. 2 shows a section of an optical waveguide fiber 70 which has a refractive index in the core 73 which decreases as a function of the radius. This is diagrammatically shown at the right of the fiber 70. The acceptance angle of the fiber 70 is not uniform. In the center 75 of the core 73, the acceptance angle will be $\theta°$, if the refractive index in the center of the fiber 70 equals $N_1$ and the refractive index at the edge 74 equals $N_2$. However, as the edge 74 is approached, the acceptance angle will continuously decrease to 0°. On the edge 74 only light rays which are incident at right angles to the fiber's end face will be accepted. Thus, it is advantageous to excite optical waveguide fibers with a beam of parallel light rays.

Figure 3:
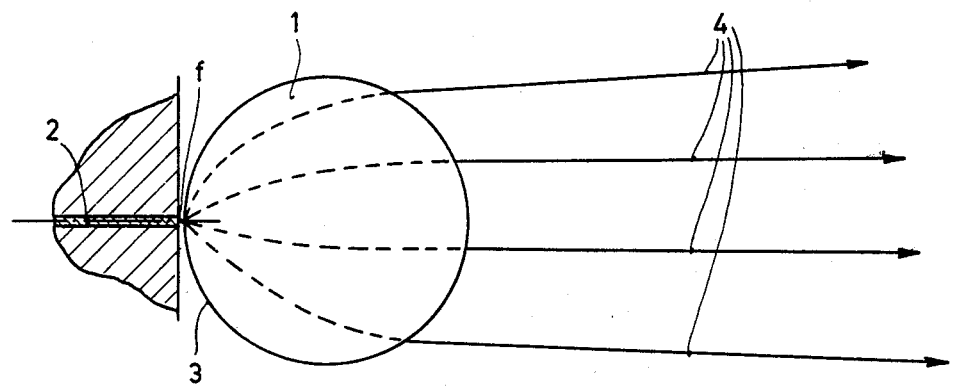
FIG. 3 diagrammatically illustrates the refraction of light rays in the convex lens.

FIG. 3 shows a convex lens 1 having a refractive index which decreases in the direction from the center towards its outer wall 3. When the lens 1 is irradiated on one side in the point f by a substantially point-shaped light source 2, the light transmitted by the lens 1 will form a narrow, substantially non-diverging light beam. The diverging light beam emitted by the light source is converted, by deflection in the lens 1, into a beam of substantially parallel light rays 4. If an optical waveguide fiber is irradiated via a lens 1, only a limited number of propagation modes will occur in a fiber having a transient-like varying index, because divergence of the light beam is substantially completely avoided.

Figure 4:
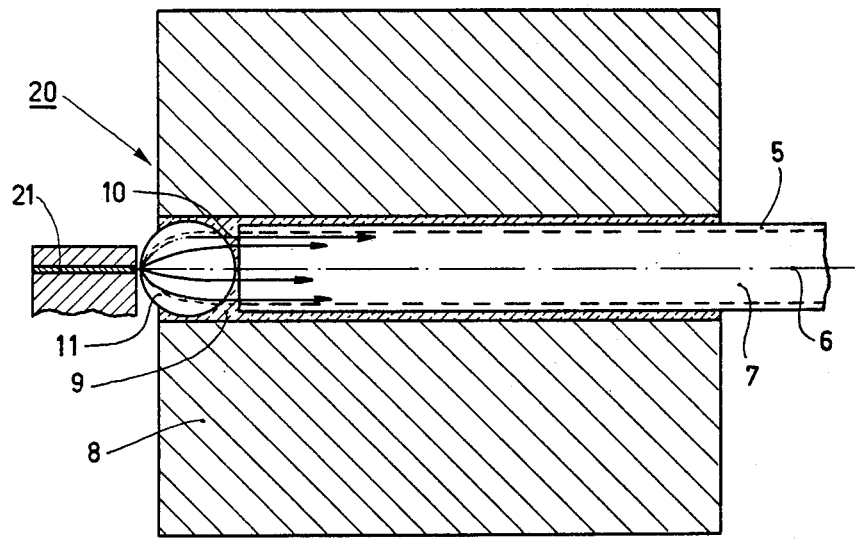
FIG. 4 is a sectional view of a coupling element and a fiber.

A coupling element 20 shown in FIG. 4 comprises a convex lens 11, preferably a ball lens, having a refractive index which decreases from the center towards the outer wall, and an optical waveguide fiber 7, both of which have a common optical axis 6. This has been achieved by the formation of a capillary duct in a holder 8 in which the fiber 7 is inserted on the one side and the lens 11 on the other side. Preferably, the capillary duct has a diameter which is only slightly greater than the diameter of the fiber and the lens. As a result of the convex shape of the lens 11, here a spherical shape, further orientation of the lens 11 relative to the fiber 7 will be superfluous. Between the lens 11 and the fiber 7 there is provided a transparent coupling medium 9 whereby refraction of the light generated by a light source 21, upon departure from the lens 11, and reflections from the entrance surface 10 of the fiber 7 are avoided. When a coupling medium 9 is used, its refractive index preferably has the same value as the refractive index of the core of the optical fiber 7.

Figure 5:
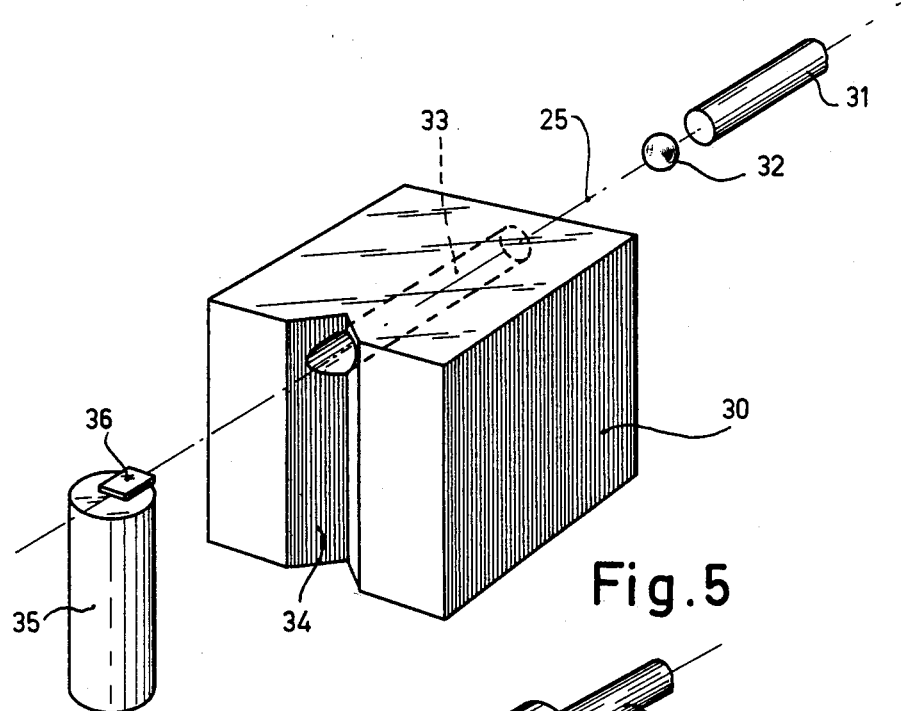
FIG. 5 shows an embodiment of a coupling element in accordance with the invention.

FIG. 5 shows a further embodiment of a coupling element according to the invention. A fiber 31 and a convex lens 32 are to be secured in a holder 30. The lens 32 has a refractive index, which decreases in the direction from the center towards its outer wall. The holder 30 is provided with a capillary 33 in which the fiber 31 and the lens 32 are to be accommodated. Both the fiber and at least a portion of the capillary are preferably circular cylindrical in shape. The fiber 31 and the lens 32 necessarily have substantially the same diameter. The fiber 31 and the lens 32 are cemented in the capillary 33 by means of a lens bond. The coupling element shown can be used very well as a basis for a fiber/semiconductor laser coupling. To this end, the holder 30 is provided with a V-shaped groove 34 which is directed perpendicularly to the capillary 33 which opens into the V shaped groove 34. In the groove 34 there is arranged a cylindrical support 35 on which a semiconductor laser 36 is secured. The semiconductor laser 36 can be adjusted to the optical axis 25 of the lens 32 and the fiber 31 by the shifting and rotation of the cylindrical support 35.

Figure 6:
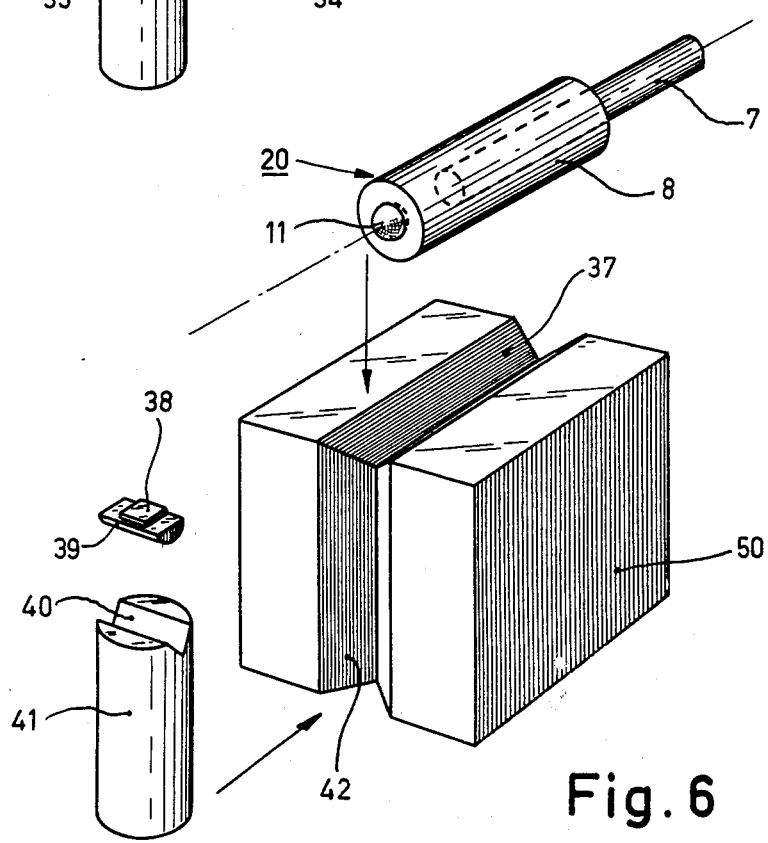
FIG. 6 shows an embodiment of an optical fiber-laser coupling in accordance with the invention.

FIG. 6 shows a further embodiment of a semiconductor laser/fiber coupling. Instead of the separate connection of the fiber 31 and the lens 32 in a capillary 33 of the holder 30 of FIG. 5, a coupling element 20 as shown in FIG. 4 is secured in a V-shaped groove 37 in a holder 50. The fiber/laser coupling is further improved in comparison with the coupling shown in FIG. 5. To this end, the laser 38 comprises an additional adjustment facility. The laser 38 is mounted on an auxiliary 39 which has a convex shape on the side which is remote from the laser 38. The convex portion of the auxiliary 39 rests in a V-shaped groove 40 in a cylindrical support 41, which in its turn rests in a V-shaped groove 42 in the holder 50. As a result of this additional adjustment facility, the groove 37 as well as the angle between the grooves 37 and 42 may satisfy less severe dimensional requirements.

Figure 7:
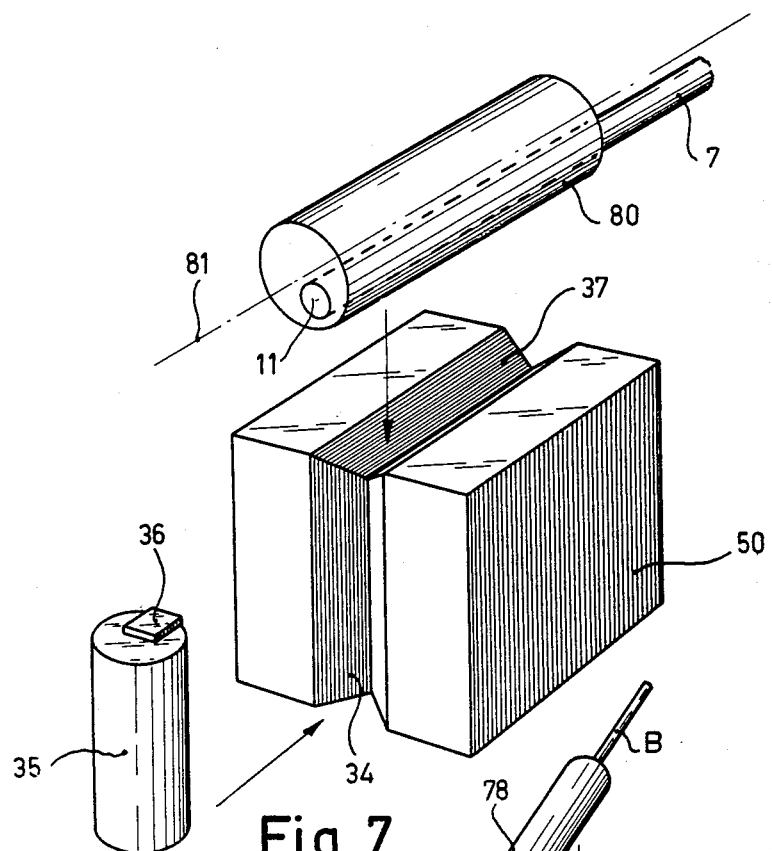
FIG. 7 shows a preferred embodiment of an optical fiber laser coupling.

FIG. 7 shows a preferred embodiment of an optical fiber/laser coupling. The holder 50 of FIG. 6 is combined with the laser 36/support 35 construction shown in FIG. 5. An additional adjustment facility is realised in that the lens 11 and the fiber 7 are secured in a capillary which is eccentriccally formed in a holder 80. The position of the lens 11 and the fiber 7 can be adapted to the position of the laser 36 by rotation of the holder 80 about its center line 81.

Figure 8:
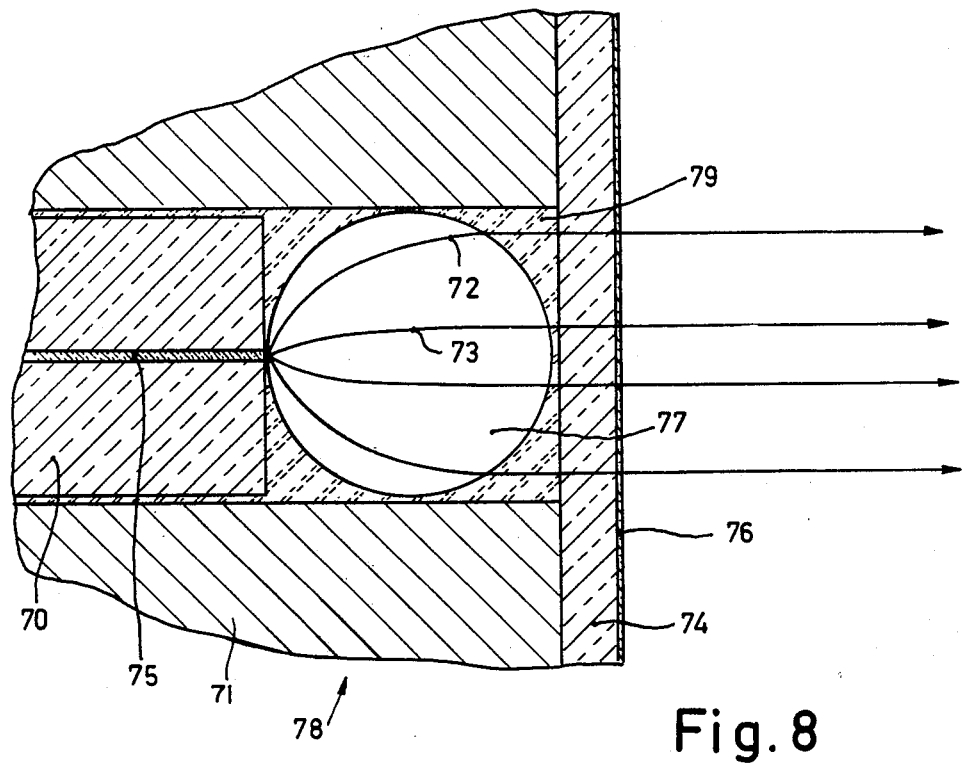
FIG. 8 shows an end of a monomode fiber in a coupling element for the fiber.

FIG. 8 shows a detail of a coupling element in which a lens 77 having a preferred refractive index variation is mounted. The lens 77 and the optical fiber 70 are positioned adjacent one another in a capillary duct of a holder 71 such that the end face of the fiber core is substantially at the focus of the lens. The fiber end face and lens are in a portion of the capillary duct which has a substantially constant diameter which is slightly larger than the fiber. The lens 77 has a refractive index variation which approximates the formula $N_1 \cdot (2-(r/R_o)^2)^{\frac{1}{2}}$.

$N_1$ is the refractive index of the surface material in the outer jacket of the lens 77 and of the core 75 of the fiber 70.

$R_o$ is the radius of the lens 77, and r is a variable which denotes the shell having the radius r in the lens 77.

The paths of the various light rays are shown in FIG. 8. The light rays diverge from a "focus" on the outer wall of the lens 77 and follow an elliptical path. As a result, the light beams extend in parallel when the outer wall of the lens 77 opposite the "focus" is reached. If the lens 77 is enclosed by a (transparent) coupling medium 79 having a refractive index $N_1$, the light rays 72 and 73 will not be subject to further refraction on the edge of the lens 77. The parallel extending light rays thus remain parallel. The holder 71 is preferably closed by a transparent cover 74. The outside of the cover 74 may be provided with an anti-reflective layer 76, if desired. The lens 77 and the holder 71 together form a coupling element 78.

Figure 9:
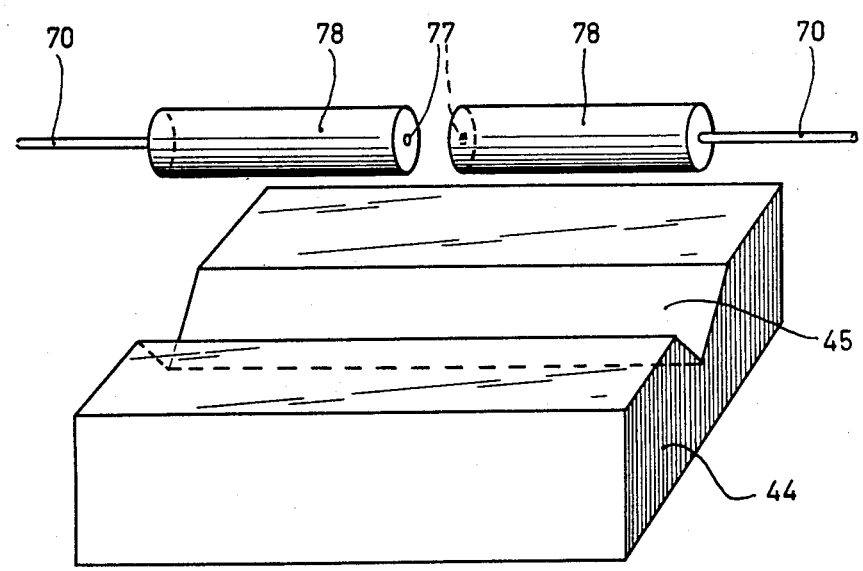
FIG. 9 shows an embodiment of a coupling for the coupling of the monomode fibers.

FIG. 9 shows a coupling between two optical waveguide fibers. The coupling comprises two coupling elements 78 and a support 44 which is provided with a V-shaped groove 45. The coupling elements 78 are secured in the groove 45. The coupling is particularly suitable for the coupling of monomode fibers. The lenses 77 arranged between the fibers 70 allow a transverse displacement of 3 μm without giving rise to excessive light transmission losses. If no lenses 77 are used an acceptable shift may amount to only tenths of 1 μm.

Furthermore, the axial distance between the coupling elements 78 is not critical. When monomode fibers 70 are coupled without lenses 77 being used, the distance between the end faces of such fibers may not amount to more than approximately 3 μm in order not exceed the same light transmission loss.

Figure 10:
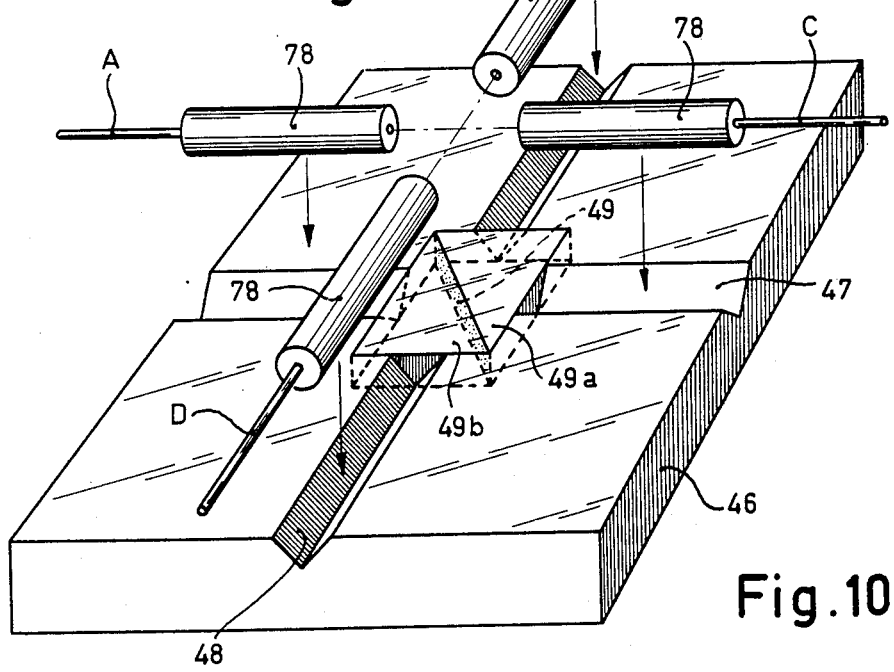
FIG. 10 shows a coupling of a monomode fiber to two other monomode fibers.

A support 44 may possibly be provided with a second V-shaped groove, which intersects the groove 45 at right angles and which is situated in the same plane. A support 46 of this kind is shown in FIG. 10. Four coupling elements 78 can be accommodated in the grooves 47 and 48 or some other means for aligning the coupling elements. If a semitransparent mirror 49 is arranged between the four coupling elements 78, so that the mirror is arranged at the intersection of the optical axes of the coupling elements 78 and encloses an angle of 45° with the axes, a coupling between a monomode fiber and two other monomode fibers is realised. For example, the fiber A is coupled to the fibers C and D and the fiber C is coupled to the fibers A and B. Thus, it will be apparent to one of ordinary skill in this art that the coupling elements 78, which are associated with each pair of coupled fibers, are aligned on a common optical axis. This optical axis may be either a straight line or, for example, intersecting lines which by virtue of mirror 49 become a common optical axis. The mirror 49 is formed by the interface of two prisms 49A and 49B which together constitute a rectangular block.

What is claimed is:

1. An optical fiber coupler, comprising:
   two or more monomode optical fibers, each of said fibers being substantially circular cylindrical with the same diameter and having a core, a cladding and an end face;
   a coupling element for each fiber comprising:
      a holder having a capillary duct therethrough, said capillary duct having at least a portion, in which the end face of the fiber is inserted, which is substantially circular cylindrical with a substantially constant diameter which is slightly larger than the diameter of the fiber; and
      a ball lens, inserted in the substantially constant diameter portion of the capillary duct at one end thereof adjacent the end face of the fiber and arranged so that the end face of the fiber core is substantially at the focus of the lens, said lens having a diameter substantially equal to the diameter of the fiber and having a refractive index which decreases from the center outwards as a function of the radius; and
   means for aligning the coupling elements on a common optical axis.

2. An optical fiber coupler as claimed in claim 1, further comprising a transparent coupling medium inserted in the capillary duct between the lens and the fiber, said medium having an index of refraction equal to that of the fiber core and equal to that of the lens at its outer wall.

3. An optical fiber coupler as claimed in claim 2 wherein the lens abuts the fiber end face.

* * * * *